United States Patent
Cripsey et al.

(10) Patent No.: US 8,444,522 B2
(45) Date of Patent: May 21, 2013

(54) FLOW-FORMED DIFFERENTIAL CASE ASSEMBLY

(75) Inventors: Timothy J. Cripsey, Rochester, MI (US); Robert J. Herston, New Baltimore, MI (US)

(73) Assignee: Metal Forming & Coining Corporation, Maumee, OH (US)

( * ) Notice: Subject to any disclaimer, the term of this patent is extended or adjusted under 35 U.S.C. 154(b) by 148 days.

(21) Appl. No.: 13/094,406

(22) Filed: Apr. 26, 2011

(65) Prior Publication Data

US 2011/0263374 A1 Oct. 27, 2011

Related U.S. Application Data

(60) Provisional application No. 61/328,239, filed on Apr. 27, 2010, provisional application No. 61/360,726, filed on Jul. 1, 2010.

(51) Int. Cl.
*F16H 48/06* (2006.01)

(52) U.S. Cl.
USPC .................................................. 475/230

(58) Field of Classification Search .............. 74/606 R, 74/607
See application file for complete search history.

(56) References Cited

U.S. PATENT DOCUMENTS

| | | | | |
|---|---|---|---|---|
| 4,959,043 A * | 9/1990 | Klotz et al. | ................... | 475/230 |
| 5,897,453 A * | 4/1999 | Mimura | .................. | 475/246 |
| 6,045,479 A * | 4/2000 | Victoria et al. | ................ | 475/230 |
| 6,061,907 A * | 5/2000 | Victoria et al. | ................ | 29/893.1 |
| 6,135,911 A | 10/2000 | Hauser | | |
| 6,146,304 A * | 11/2000 | Bendtsen | ...................... | 475/230 |
| 6,176,152 B1 * | 1/2001 | Victoria et al. | ................ | 74/607 |
| 6,227,024 B1 | 5/2001 | Koestermeier | | |
| 6,379,277 B1 * | 4/2002 | Victoria et al. | ................ | 475/231 |
| 6,434,991 B1 | 8/2002 | Jaschka | | |
| 6,652,408 B2 | 11/2003 | Rutt et al. | | |
| 6,840,883 B2 | 1/2005 | Orr et al. | | |
| 6,855,088 B1 * | 2/2005 | Chu | ............................... | 475/230 |
| 6,945,898 B2 * | 9/2005 | Szuba | ......................... | 475/230 |
| 6,983,632 B2 | 1/2006 | Mayfield | | |
| 7,025,702 B2 | 4/2006 | Saito | | |
| 7,207,110 B2 * | 4/2007 | Pascoe et al. | ................ | 29/893.2 |
| 7,261,664 B2 | 8/2007 | Szuba | | |
| 7,306,537 B2 | 12/2007 | Nakajima | | |
| 7,350,391 B2 | 4/2008 | Takagi | | |
| 7,367,914 B2 * | 5/2008 | Rosochacki et al. | .......... | 475/230 |
| 7,445,088 B2 | 11/2008 | Watanabe et al. | | |
| 7,485,064 B2 | 2/2009 | Rosochacki et al. | | |
| 7,695,392 B2 | 4/2010 | Isken, II et al. | | |
| 7,721,409 B2 * | 5/2010 | Lindsay et al. | ................. | 29/557 |
| 7,819,040 B2 | 10/2010 | Meier et al. | | |
| 8,079,929 B2 * | 12/2011 | Yeh | ................ | 475/230 |
| 8,152,678 B2 * | 4/2012 | Fujii et al. | ..................... | 475/221 |

(Continued)

*Primary Examiner* — Dirk Wright

(74) *Attorney, Agent, or Firm* — Fraser Clemens Martin & Miller LLC; J. Douglas Miller

(57) ABSTRACT

A differential case assembly includes a differential case having an open end and a side wall with an interior surface. A plurality of major internal splines is formed on the interior surface of the side wall. The differential case assembly further includes a gear assembly with a retainer insert and a cross pin. The retainer insert is disposed adjacent the interior surface of the side wall between a pair of the major internal splines. The retainer insert has a hole formed therein. The cross pin has an end received in the hole of the retainer insert. The gear assembly is thereby aligned within the differential case.

19 Claims, 13 Drawing Sheets

U.S. PATENT DOCUMENTS

| | | |
|---|---|---|
| 2006/0276296 A1 | 12/2006 | Rosochacki et al. |
| 2006/0278036 A1 | 12/2006 | Rosochacki et al. |
| 2008/0016670 A1 | 1/2008 | Meier |
| 2009/0013533 A1 | 1/2009 | Isken, II et al. |
| 2009/0137357 A1 | 5/2009 | Meier et al. |
| 2009/0215572 A1 | 8/2009 | Yeh |
| 2009/0266198 A1* | 10/2009 | Nosakowski ............... 74/606 R |
| 2012/0000314 A1* | 1/2012 | Cripsey et al. .................. 74/607 |

* cited by examiner

FLOW-FORMED DIFFERENTIAL CASE ASSEMBLY

CROSS-REFERENCE TO RELATED APPLICATIONS

This application claims the benefit of U.S. Provisional Application No. 61/328,239 filed on Apr. 27, 2010, and U.S. Provisional Application No. 61/360,726 filed on Jul. 1, 2010. The entire disclosure of each of the above applications is hereby incorporated herein by reference.

FIELD OF THE INVENTION

The present disclosure relates to a differential case assembly and, particularly, a differential case assembly for use in a motorized vehicle.

BACKGROUND OF THE INVENTION

A differential is a device, usually employing gears, that is capable of transmitting torque and permitting rotation of different shafts at different speeds. Known differentials have cases that are cast from metals such as iron, and are often heavy and volumetrically undesirable. Assembly of known differentials can be difficult, oftentimes requiring bolting as well as welding. The use of "feed-in and rotate processes" when cast iron differential cases are manufactured is also known. Welding of the differentials formed from cast iron, in particular, can undesirably require the use of filler wire to provide an acceptable weld.

There is a continuing need for a differential case assembly that is lighter compared to known cast iron designs, minimizes a required packaging space, minimizes assembly complexity, and can be employed with different numbers of gears. A differential case assembly that facilitates welding and eliminates a need for multiple nuts/bolts in the assembly process is also desired.

SUMMARY OF THE INVENTION

In concordance with the instant disclosure, a differential case assembly that is lighter compared to known cast iron designs, minimizes a required packaging space, minimizes assembly complexity, can be employed with different numbers of gears, facilitates welding, and eliminates a need for multiple nuts/bolts in the assembly process, is surprisingly discovered.

In one embodiment, a differential case assembly includes a differential case having an open end and a side wall with an interior surface, A plurality of major internal splines is formed on the interior surface of the side wall. The differential case assembly further includes a gear assembly. The gear assembly has a retainer insert and a cross pin. The retainer insert is disposed adjacent the interior surface of the side wall between a pair of the major internal splines. The retainer insert has a hole formed therein. The cross pin has an end mounted in the hole of the retainer insert. The cross pin aligns the gear assembly within the differential case.

In another embodiment, a differential case assembly includes a differential case having an open end and a side wall with an interior surface. A plurality of major internal splines is formed on the interior surface of the side wall. The differential case assembly further includes a gear assembly. The gear assembly has a cross pin with an end having a pair of beveled surfaces. The beveled surfaces of the cross pin cooperate with a pair of the major internal splines to align the gear assembly within the differential case.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
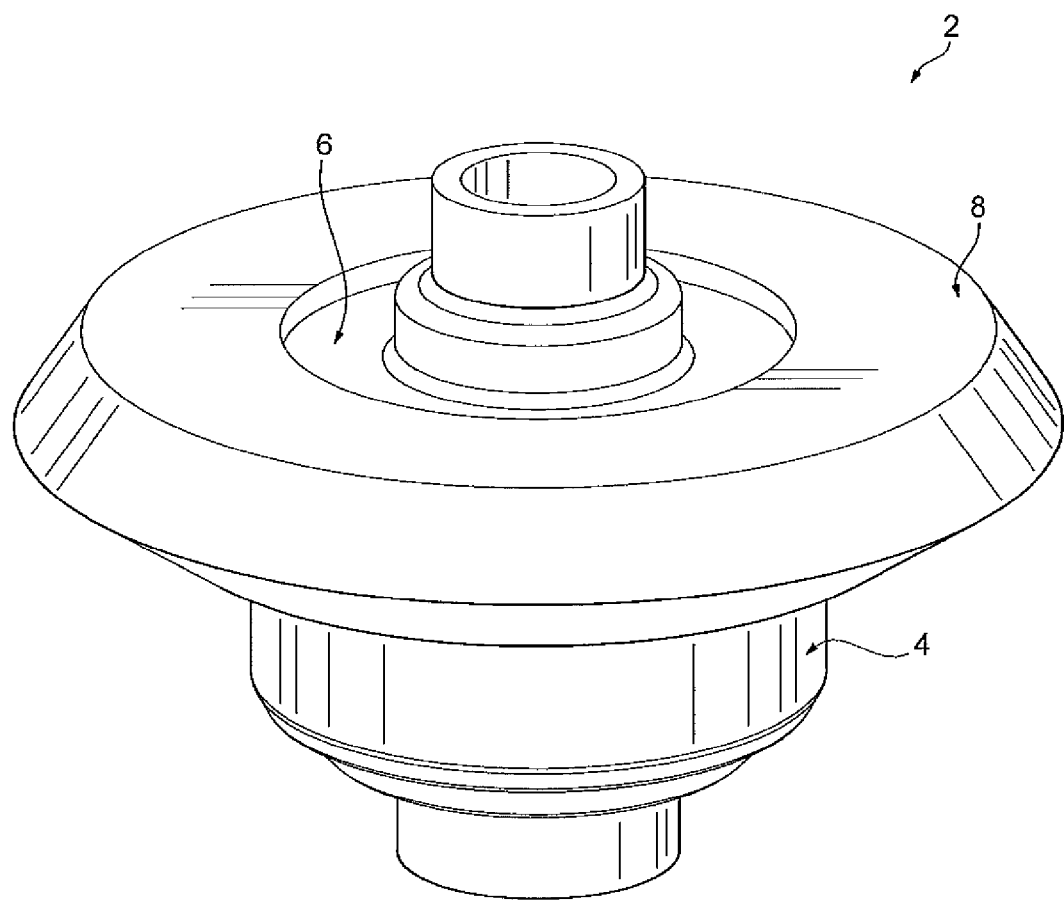
FIG. 1 is a perspective view of a differential case assembly according to a first embodiment of the present disclosure.
Figure 2:
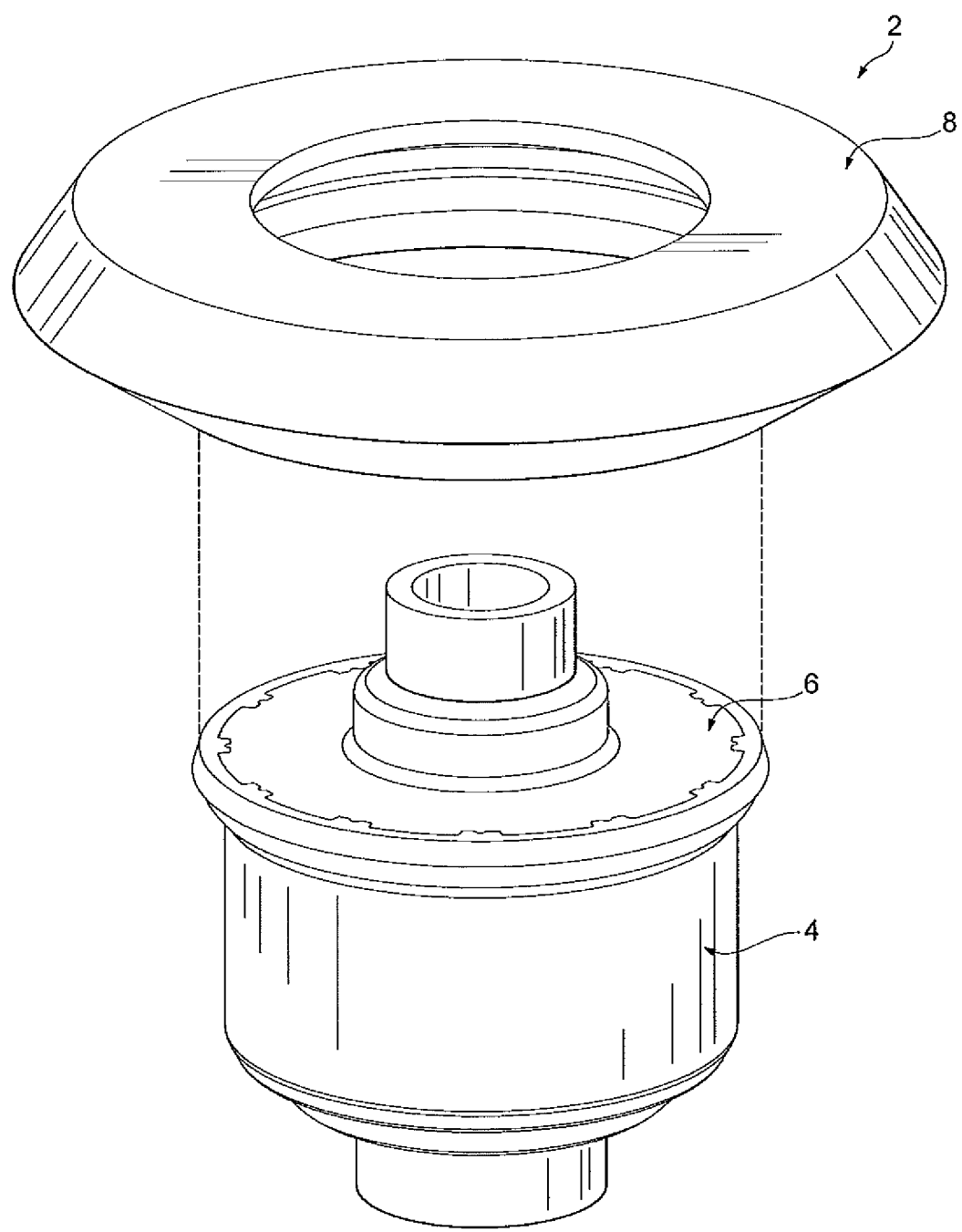
FIG. 2 is a partially exploded perspective view of the differential case assembly shown in FIG. 1.
Figure 3:
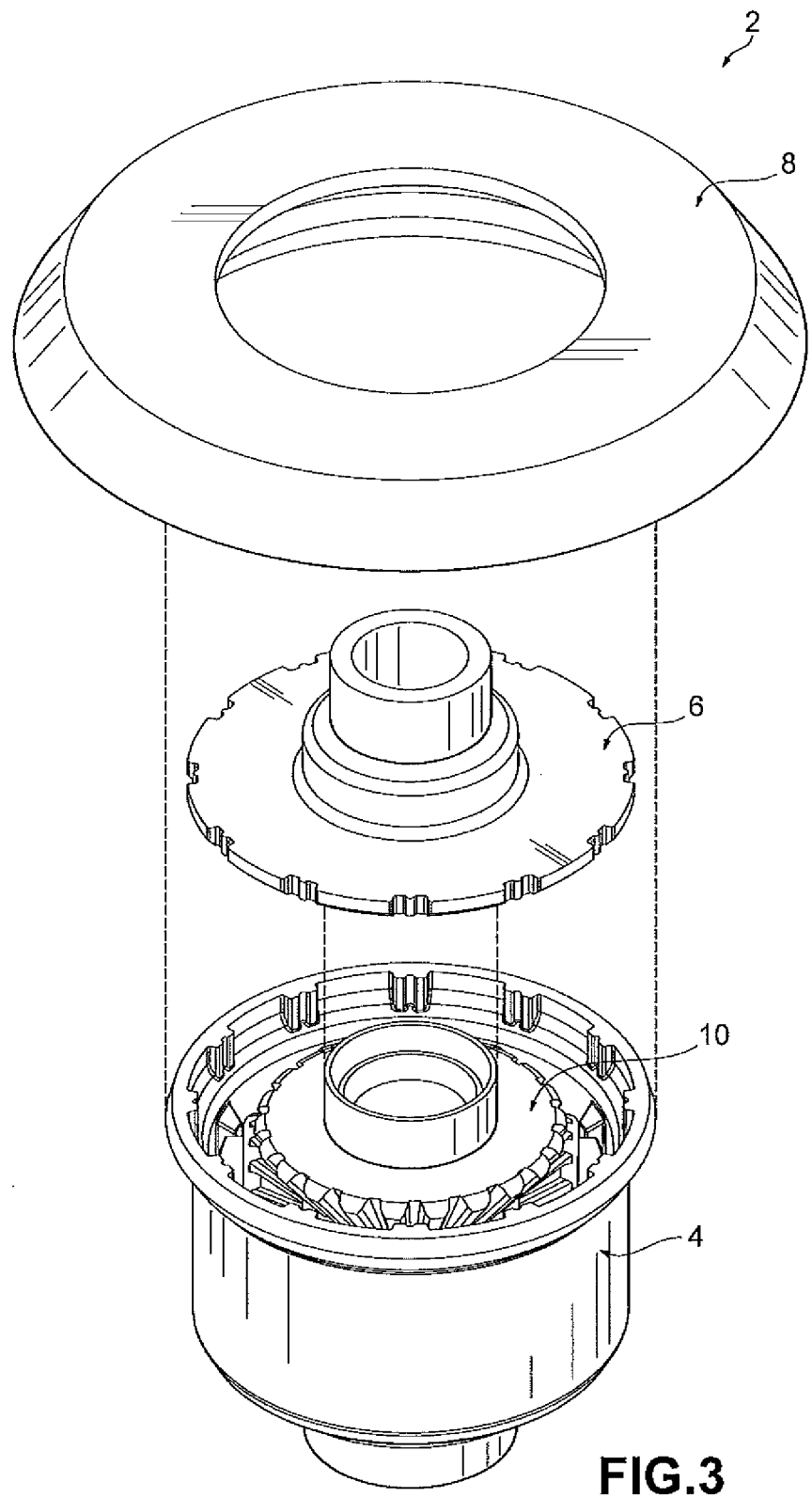
FIG. 3 is another partially exploded perspective view of the differential case assembly shown in FIG. 1.
Figure 4:
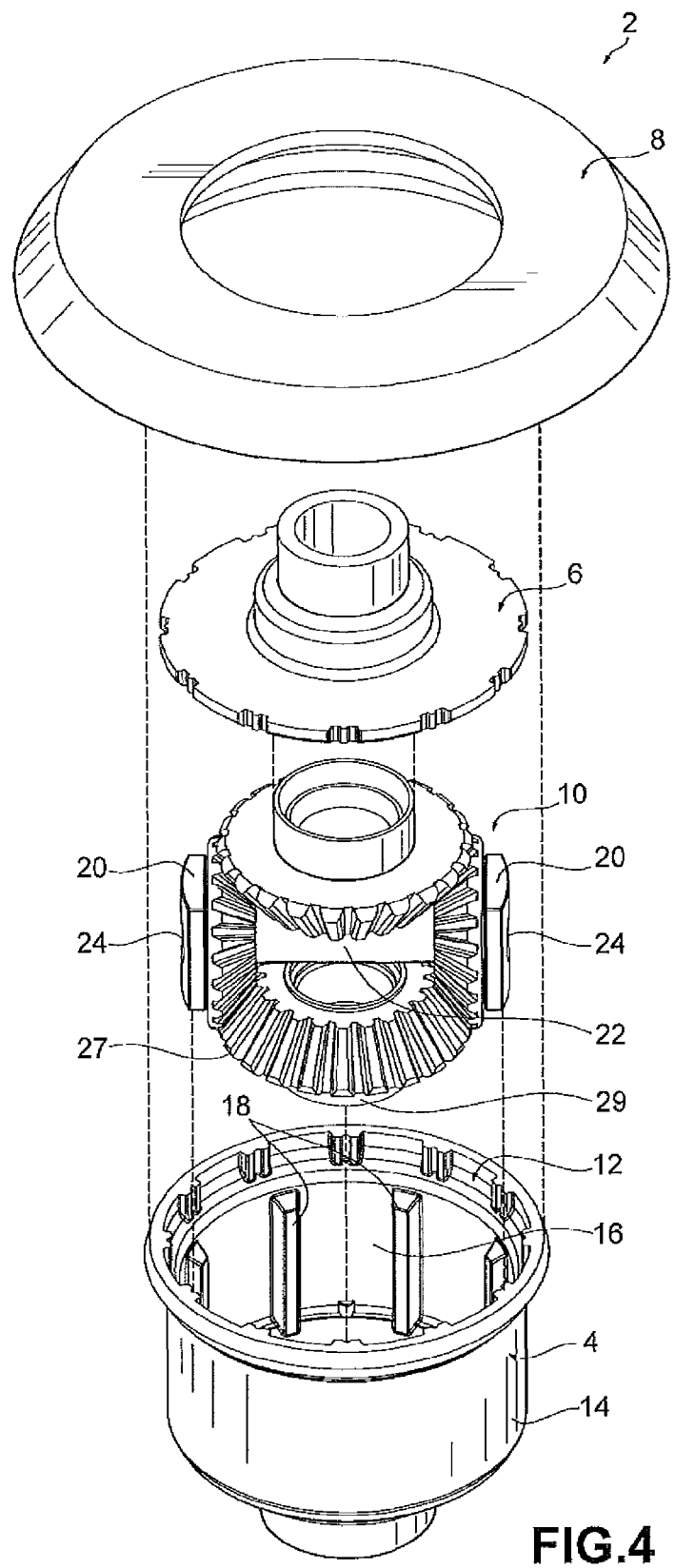
FIG. 4 is a further partially exploded perspective view of the differential case assembly shown in FIG. 1.
Figure 5:
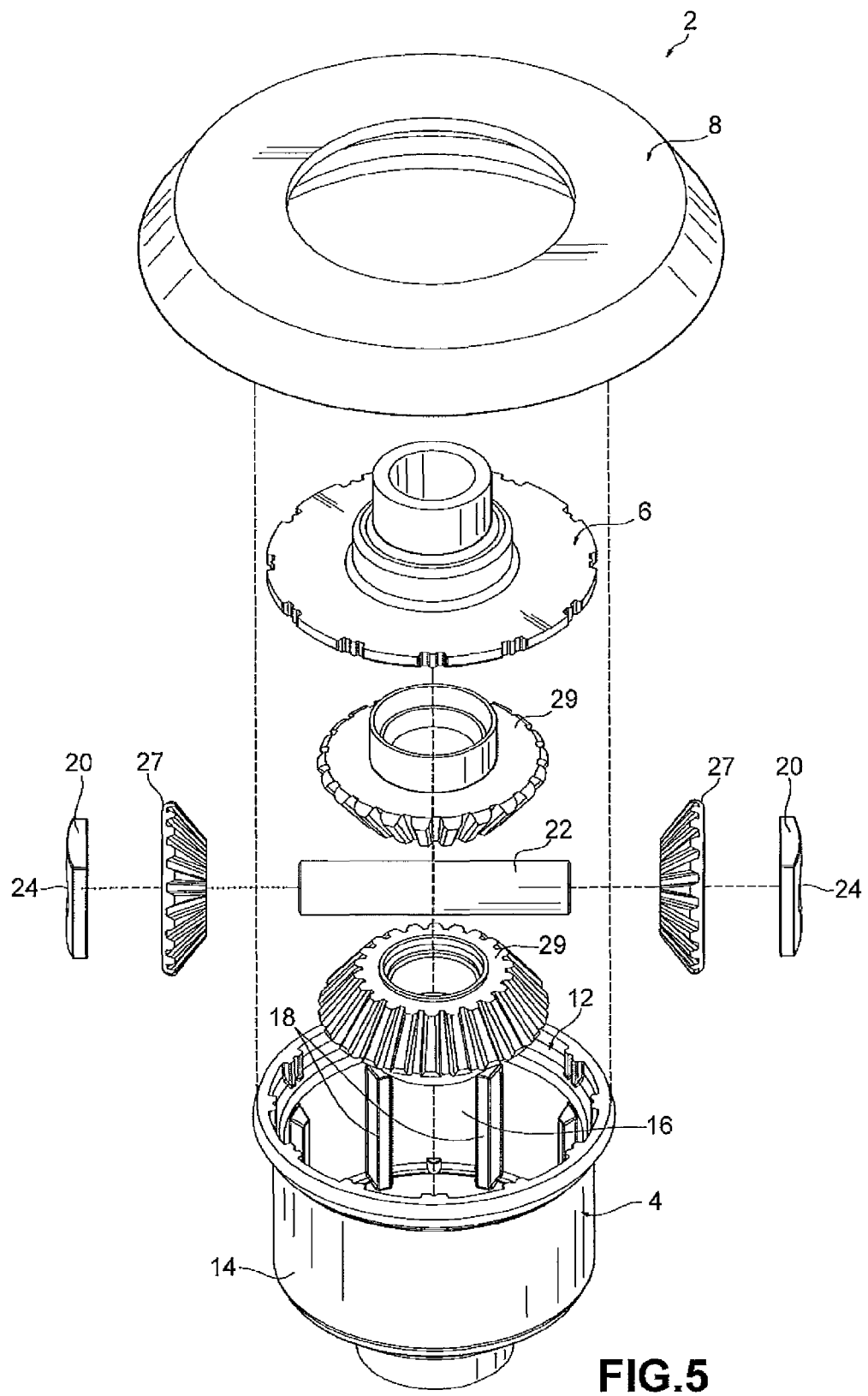
FIG. 5 is a fully exploded perspective view of the differential case assembly shown in FIG. 1.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

FIGS. 1-12 depict a differential case assembly 2 according to a first embodiment of the present disclosure. With particular reference to FIGS. 1-5, the differential case assembly 2 includes a differential case 4, an end cap 6, a ring gear 8, and a gear assembly 10. The differential case 4, the end cap 6, and the ring gear 8 cooperate to house the gear assembly 10.

Figure 6:
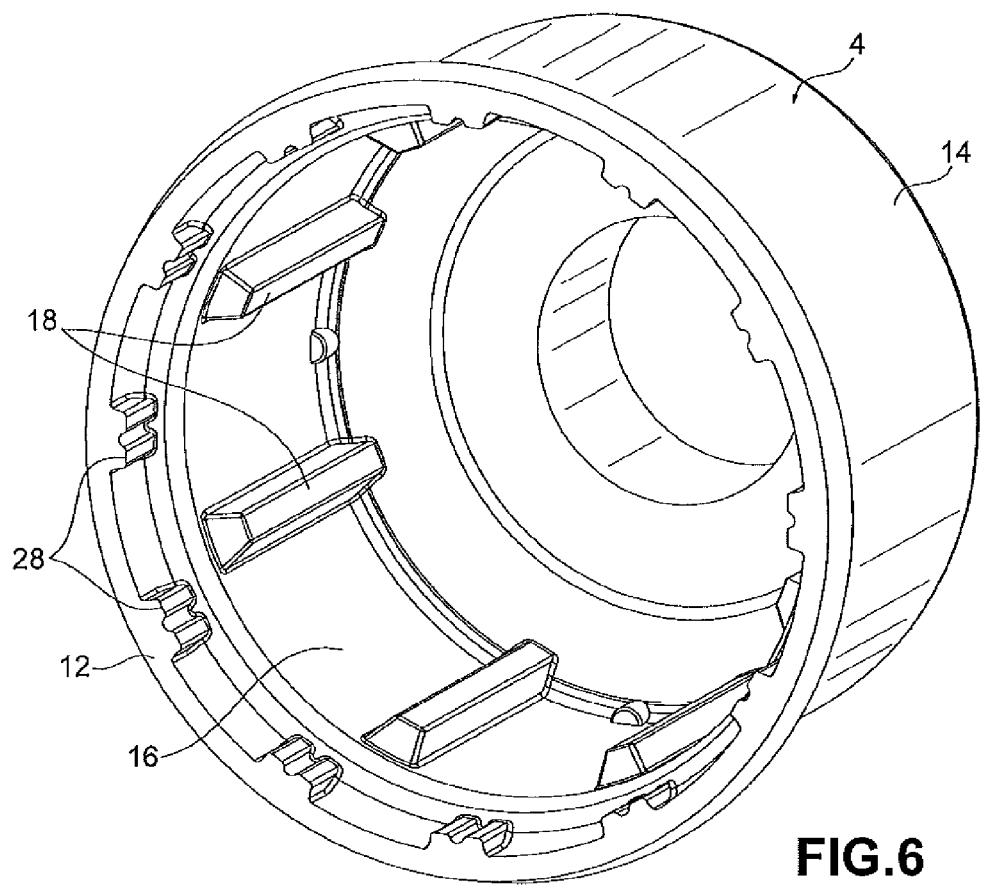
FIG. 6 is a perspective view of a flow formed housing of the differential case assembly shown in FIGS. 1-5.

As shown in FIG. 6, the differential case 4 has an open end 12 and a side wall 14 with an interior surface 16. For example, the differential case may be a flow formed shell as described further herein. A plurality of major internal splines 18 is formed on the interior surface 16 of the side wall 14. The major internal splines 18 extend radially inwardly from the interior surface 16 of the side wall 14. Any number of major internal splines 18, as well as any spacing of the major internal splines 18, may be employed as desired.

Figure 7:
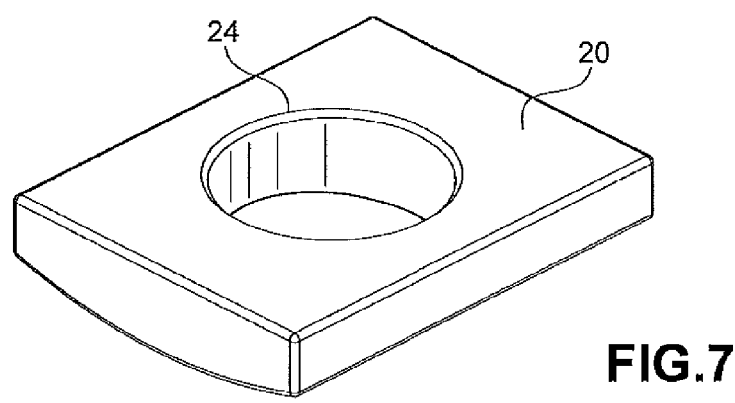
FIG. 7 is a perspective view of an adapter insert of the differential case assembly shown in FIGS. 1-5.
Figure 8:
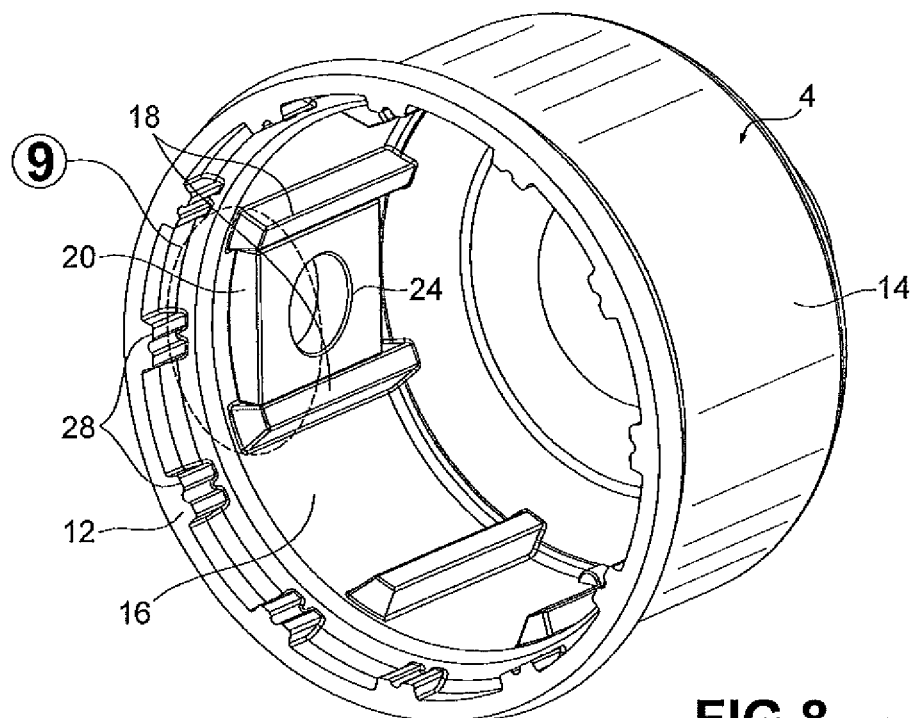
FIG. 8 is a perspective view of the flow formed housing of FIG. 6 with the adapter insert of FIG. 7 disposed therein.
Figure 9:
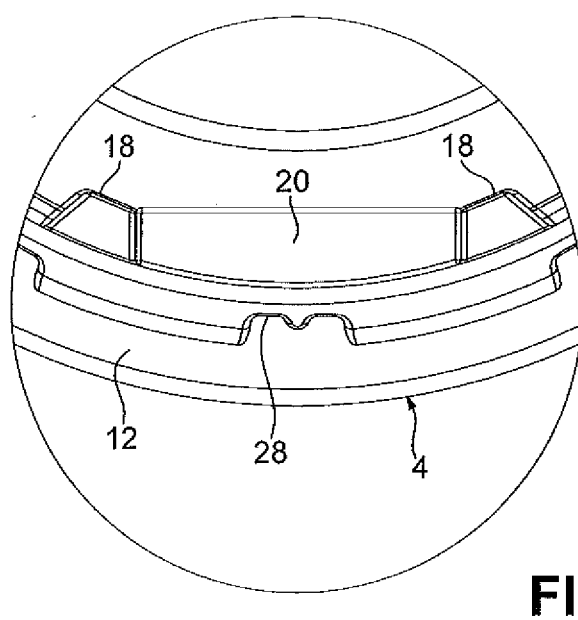
FIG. 9 is an enlarged fragmentary elevational view of the flow formed housing and adapter insert shown in circle 9 of FIG. 8.
Figure 10:
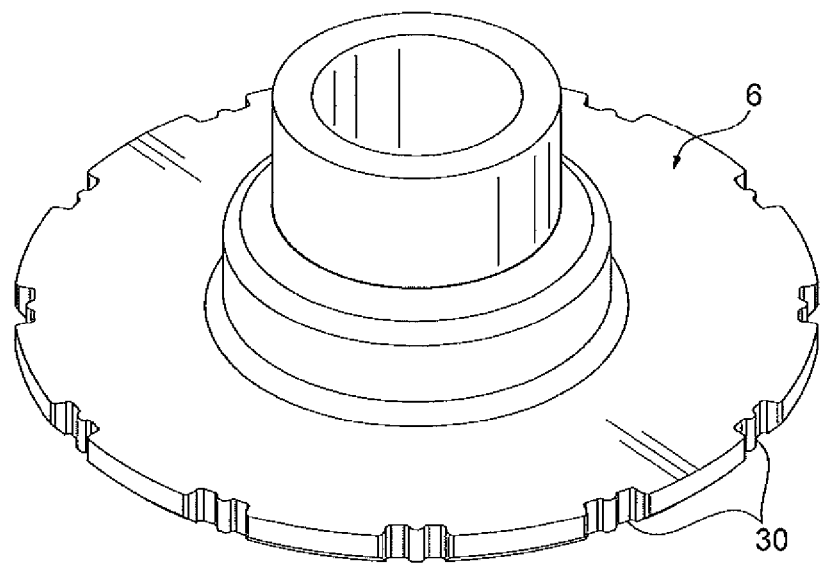
FIG. 10 is a perspective view of an end cap of the differential case assembly shown in FIGS. 1-5.

The gear assembly 10 includes a pair of retainer inserts 20, for example, as shown in FIG. 7, and a cross pin 22. Each of the retainer inserts 20 is disposed adjacent the interior surface 16 of the side wall 14 between a pair of the major internal splines 18, for example, as shown in FIGS. 8 and 9. Each of the retainer inserts 20 has a hole 24 formed therein. The retainer insert 20 may be cold formed or hot formed, as nonlimiting examples. Other methods for forming the retainer insert 20 may also be used, as desired. The cross pin 22 has ends 26 that are respectively received in the holes 24 of the retainer inserts 20. The retainer inserts 20 thereby align the gear assembly 10 within the differential case 4.

The gear assembly 10 further includes at least one side gear 27 disposed on the cross pin 22 and cooperating with at least one pinion gear 29. Although pairs of the side gears 27 and the pinion gears 29 are illustrated in FIGS. 1-5, it should be appreciated that a single side gear 27 and a single pinion gear 29 may be used within the scope of the present disclosure. The retainer insert 20 accurately locates the side and pinion gears 27, 29 within the differential case 4. The retainer insert 20 also transfers a load from the cross pin 22 along an entire length of the major internal splines 18, between which the retainer insert 20 is disposed.

The end cap 6 is disposed in the open end 12 of the differential case 4. In certain embodiments, the end cap 6 has a main body that is welded to the differential case 4 to seal the open end 12 thereof. In a particular embodiment, the end cap 6 is press fit within the open end 12 of the differential case 4. For example, as respectively shown in FIGS. 6 and 10, the differential case 4 may have an annular array of minor internal splines 28 formed on the open end 12, and the end cap 6 may have an annular array of minor external splines 30. The minor external splines 30 of the end cap may mesh with the minor internal splines 28 of the differential case 4 when the end cap 6 is press fit within the open end 12 of the differential case 4. The end cap 6 may be manufactured by any desired process such as hot forming or cold forming, as nonlimiting examples, suitable for also forming the minor external splines 30.

Figure 12:
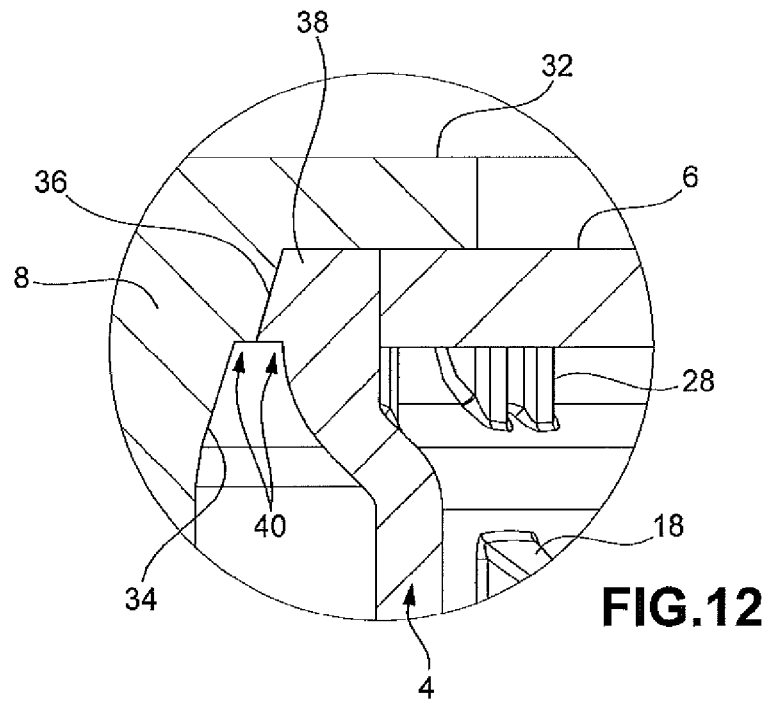
FIG. 12 is a fragmentary enlarged side cross-sectional elevational view of the different case assembly shown in circle 12 of FIG. 11.

The ring gear 8 is joined to the differential case 4 and the end cap 6 to hold the differential case assembly 2 together. In particular, the ring gear 8 has a main body with a lip 32 that axially retains the end cap 6 in the differential case 4, as shown in FIG. 12. The lip 32 axially retains the end cap 6 by militating against the end cap 6 being removed from the open end 12 of the differential case 4. The ring gear 8 is further welded to the differential case 4 after the end cap 6 is disposed within the open end 12 of the differential case 4 to form the differential case assembly 2. It should be appreciated that the differential case assembly 2 of the present disclosure may be advantageously formed with a single welding operation, and without other securing means such as bolts and the like that are known in the art.

Figure 11:
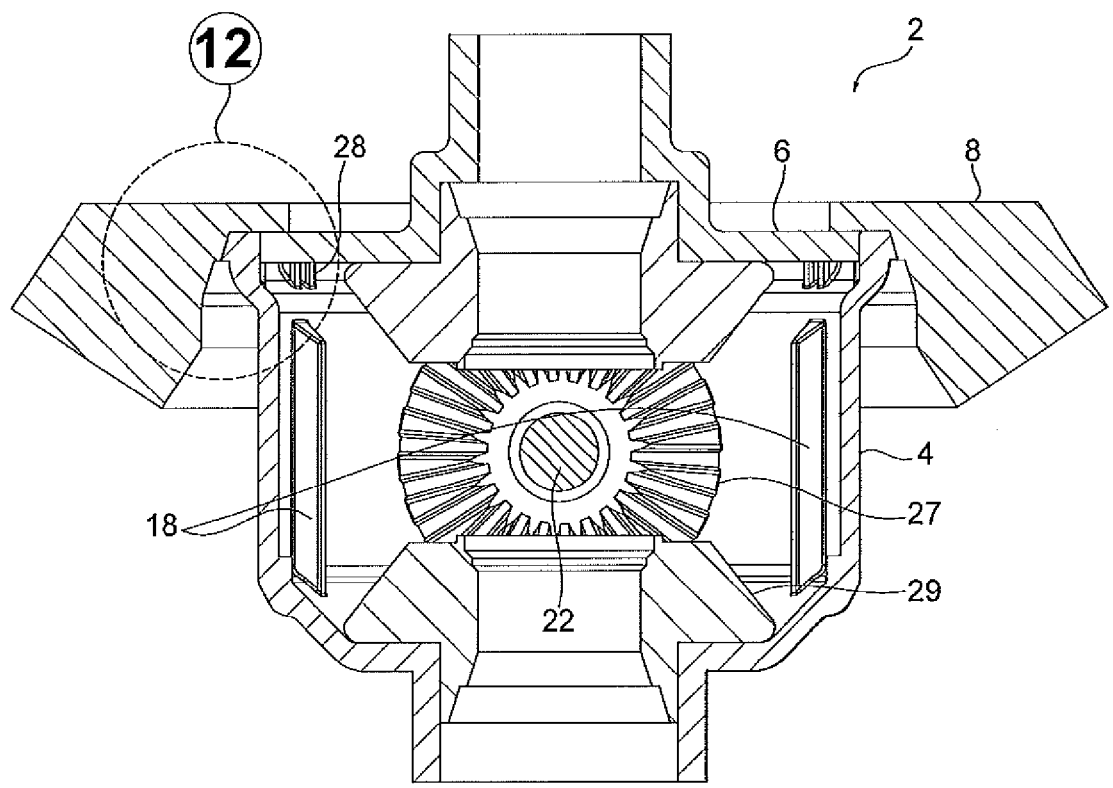
FIG. 11 is a cross-sectional elevational view of the differential case assembly shown in FIG. 1.

In particular embodiments illustrated in FIGS. 11 and 12, the ring gear 8 may have an angled inner surface 34 that permits access to a joint 36 between the differential case 4 and the ring gear 8 for the welding operation such as laser welding or the like. Advantageously, where laser welding is employed and each of the ring gear 8 and the differential case 4 is formed from steel, it should be appreciated that filler wire may not be required. Thus, the differential case assembly 2 of the present disclosure is more suited to laser welding than cast iron differential case assemblies known in the art.

The angled inner surface 34 also provides a radial clamping force on the open end 12 of the differential case 4 to further secure the differential case 4 to the end cap 6. An outer diameter of the differential case 4 may also increase adjacent the open end 12. The increase in outer diameter of the differential case 4 also permits access to the joint 36 between the differential case 4 and the ring gear 8 for the welding operation.

As shown in FIG. 12, the ring gear 8 may have a varying inner diameter at the joint 36 that cooperates with a tapered end portion 38 of the differential case 4. One of ordinary skill in the art should understand that the cooperation of the ring gear 8 with the tapered end portion 38 of the differential case gear 8 militates against the differential case 4 "breathing outwards" during an operation of the differential case assembly 2.

Each of the ring gear 8 and the tapered end portion 38 of the differential case 4 may also have a flat portion 40 adjacent the joint 36 to facilitate the welding operation, as desired.

FIGS. 13-20 illustrate the differential case assembly 2' according to a second embodiment of the present disclosure. In FIGS. 13-20, like or related structures from FIGS. 1-12 have the same reference numeral with a prime symbol (') for the purpose of clarity.

Figure 13:
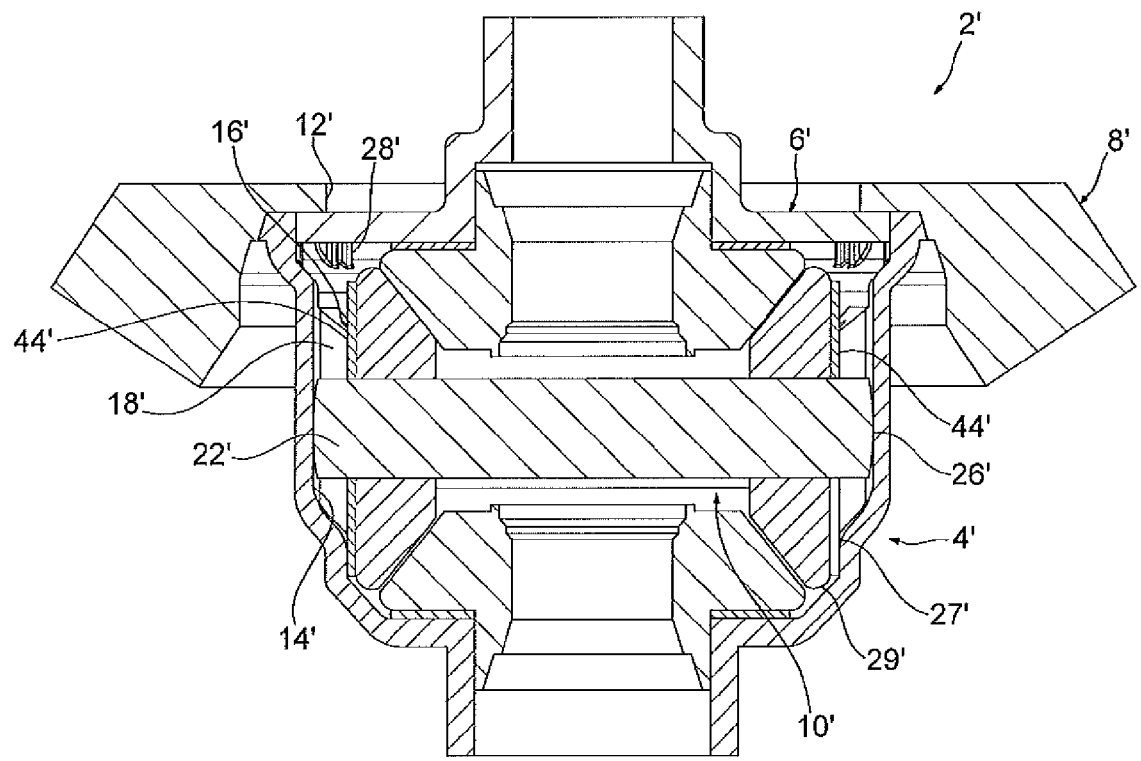
FIG. 13 is a cross-sectional view of a differential case assembly according to a second embodiment of the present disclosure.

Referring to FIG. 13, the differential case assembly 2' includes the differential case 4' and the gear assembly 10'. The differential case 4' includes the open end 12' and the side wall 14' with the interior surface 16'. The plurality of major internal splines 18' is formed on the interior surface 16' of the side wall 14'. The gear assembly 10' includes the cross pin 22' and the at least one side gear 27'. The at least one side gear 27' is disposed on the cross pin 22' and cooperates with the pinion gear 29'.

Figure 14:
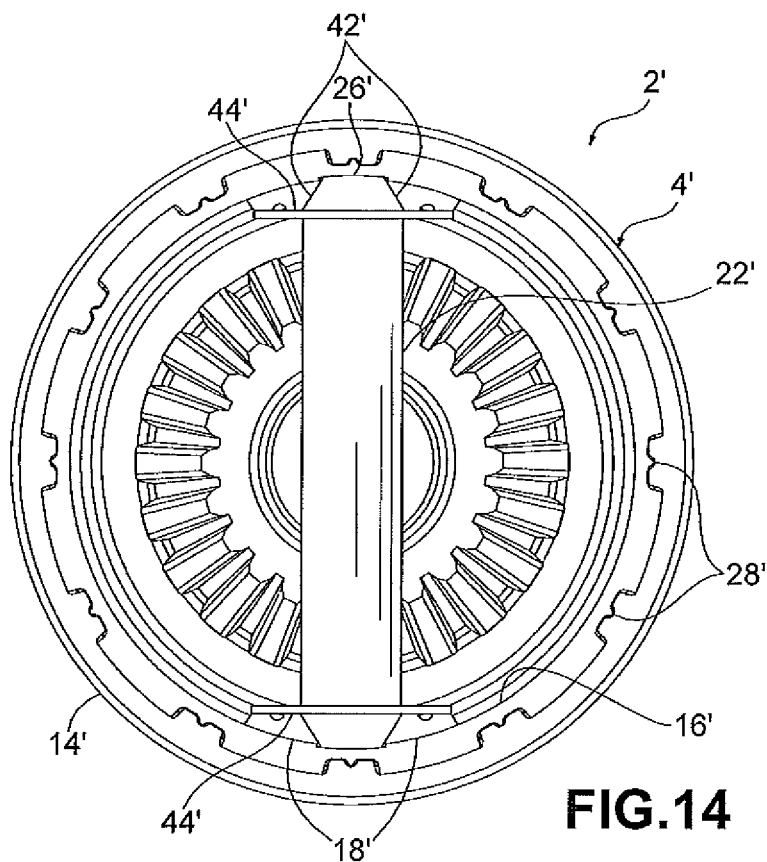
FIG. 14 is a plan view of the differential case assembly shown in FIG. 13.
Figure 15:
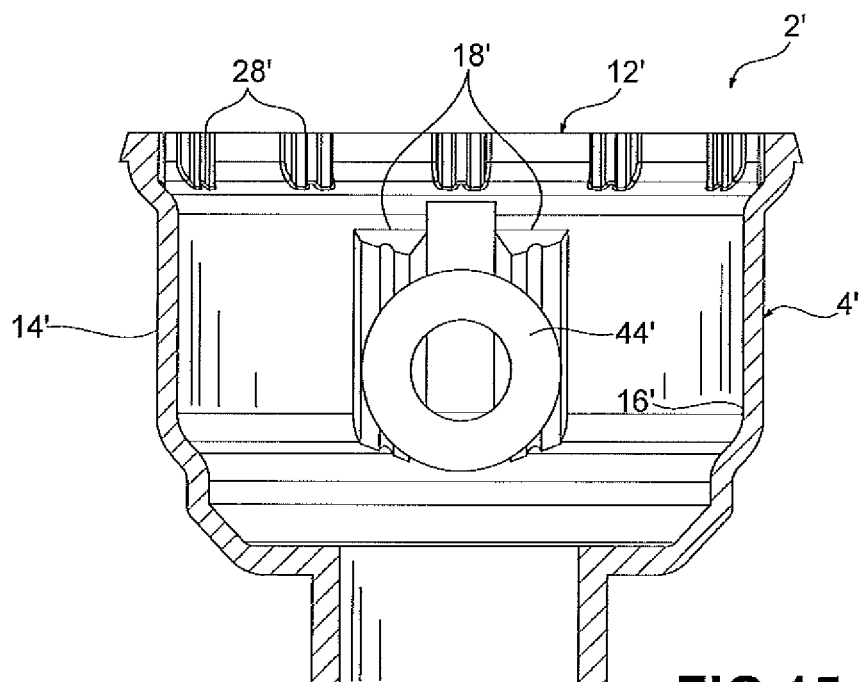
FIG. 15 is a cross-sectional elevational view of the differential case assembly shown in FIG. 13, showing a placement of a washer relative to a pair of splines for holding a cross pin.
Figure 16:
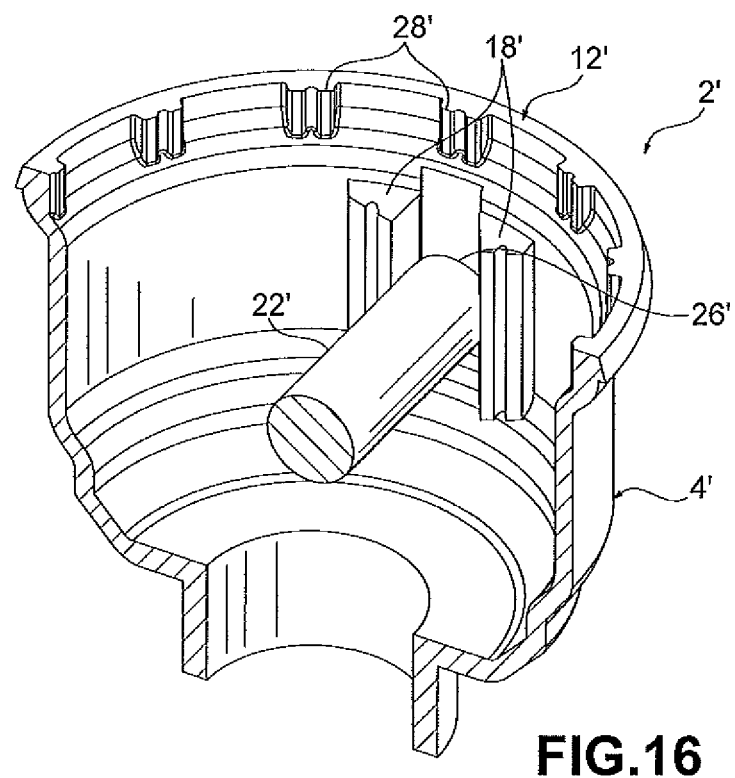
FIG. 16 is a fragmentary cross-sectional perspective view of the differential case assembly shown in FIG. 13, showing a cooperation of the cross-pin with the pair of splines without a washer.
Figure 17:
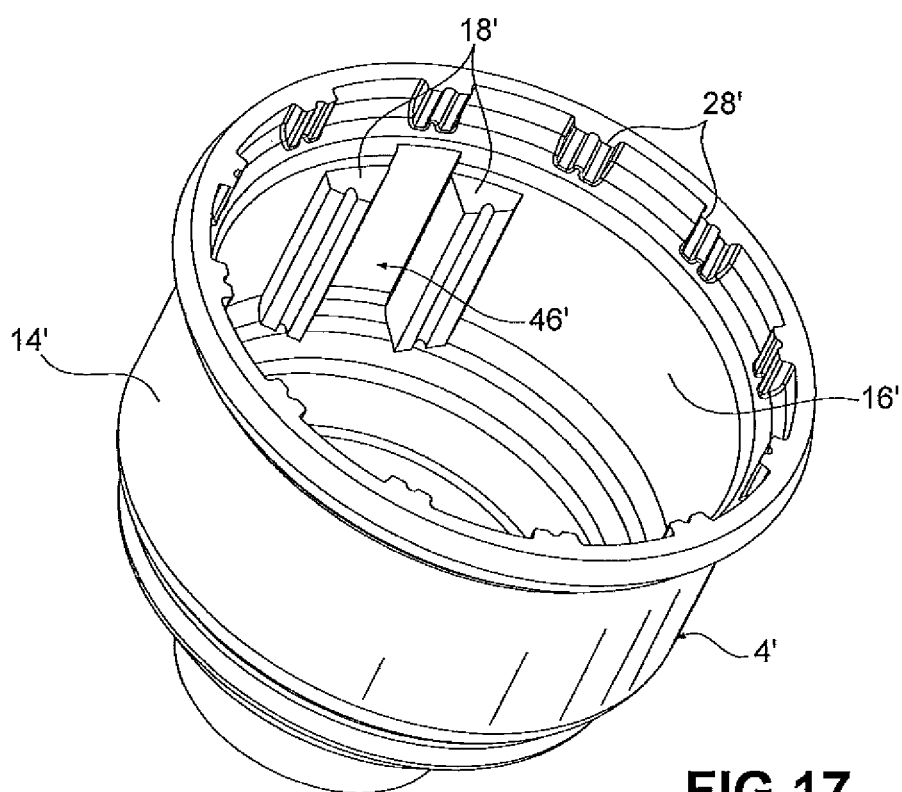
FIG. 17 is a perspective view of a flow formed housing of the differential case assembly shown in FIG. 13.
Figure 18:
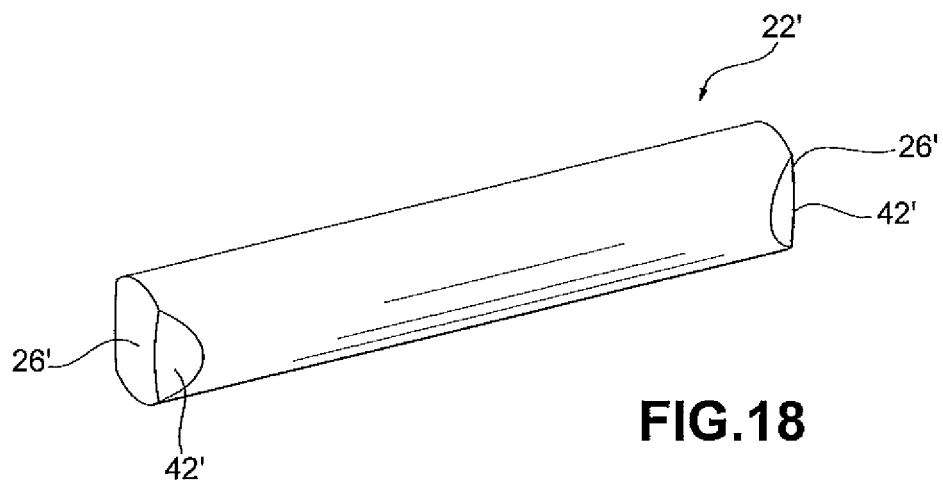
FIG. 18 is a perspective view of a cross pin of the differential case assembly shown in FIG. 13.
Figure 19:
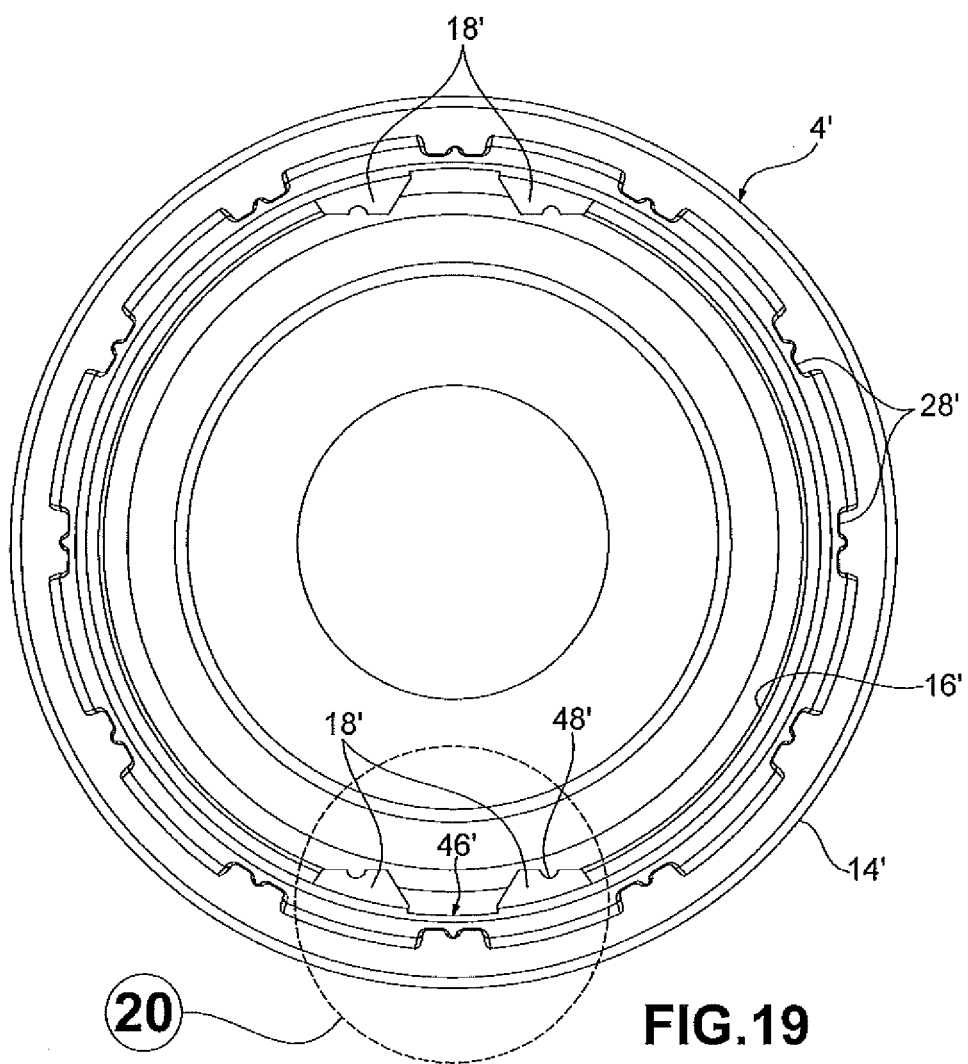
FIG. 19 is a plan view of the flow formed housing of the differential case assembly shown in FIG. 13.

As shown in FIGS. 14 and 18, the ends 26' of the cross pin 22' have a pair of beveled surfaces 42'. The beveled surfaces 42' of the cross pin 22' cooperate with the pair of the major internal splines 18' to align the gear assembly 10' within the differential case 4'. For example, the major internal splines 18' may have angled surfaces that correspond to an angle of the beveled surfaces 42' of the cross pin 22'. The major internal splines 18' locate the cross pin 22' and thus, the gear assembly 10' within the differential case 4'. The major internal splines 18' further absorb a load from the cross pin 22' during an operation of the differential case assembly 2'. It should be appreciated that the employment of the cross pin 22' with the beveled surfaces 42' may thereby displace a use of the retainer inserts 20 described hereinabove.

The gear assembly 10' further includes a washer 44' disposed over the cross pin 22' adjacent each the end 26' of the cross pin 22'. The washers 44' are further disposed adjacent the pair of major internal splines 18' formed on the interior surface 16' of the side wall 14' of the differential case 4'. A surface of each of the pair of major internal splines 18' supports the washers 44', for example. In particular embodiments, a length of each of the major internal splines 18' supporting the washers 44' is sufficient to support the washers 44' along substantially an entire length thereof. The major internal splines 18' thereby absorb radial loads of the side and pinion gears 27', 29' through the washers 44'.

The interior surface 16' of the side wall 14' of the differential case 4' may include a recess 46' between the pair of major internal splines 18'. The recess 46' may result from a thinning of the side wall 14'. For example, a thickness of the side wall 14' between the pair of the major internal splines 18' may be less than a thickness of the side wall 14' outside of the pair of the major internal splines 18'. The recess 46' provides additional surface area for contact between the major internal splines 18' and the beveled surfaces 42' of the cross pin 20', without adding additional mass to the differential case assembly 2'. The recess 46' thereby militates against a rotation of the cross pin 20' within the differential case assembly 2' in operation.

Figure 20:
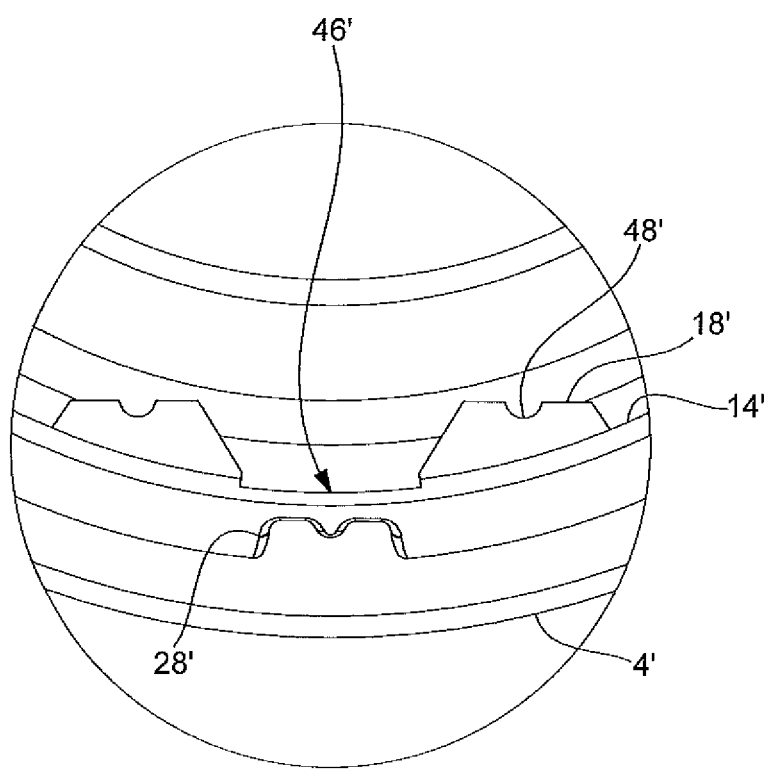
FIG. 20 is a fragmentary enlarged plan view of the flow formed housing of the differential case assembly shown in circle 20 of FIG. 19.

As shown in FIG. 20, each of the major internal splines 18' may have a groove 48' formed in an end thereof. The grooves 48' serve to improve a formability of the major internal splines 18', for example, by flow forming. The grooves 48' also allow oil to reach joints within the differential case assembly 2' during an operation thereof.

In particularly advantageous embodiments, the differential case 4, 4' is flow formed. A suitable preform such as a cold formed, hot forged, or flat blank metal part may be flow formed with various net formed features such as the major internal splines 18, 18', cavities for oil holes, the minor internal splines 28, 28', and additional splines for axial location control or support of the retainer inserts 20, as nonlimiting examples. Other suitable features can also be net formed by flow forming, as desired. The preform may be formed from any material that can be flow formed, such as steel. Other suitable metals may also be employed, as desired. In particular embodiments, the preform is an engineered preform configured to have a shape that allows the part to be flow formed, the weld joints to be successful, and the final part to be strong enough to withstand typical loads in operation.

Skilled artisans should appreciate that the flow forming process for manufacturing the differential case 4, 4' results in a plastic deformation of the perform and a non-interrupted grain flow for the formed difference case 4, 4'. Through plastic deformation, the preform material undergoes work hardening and can become stronger than the original preform material. The flow formed difference case 4, 4' furthermore has minimal porosity and can be made thinner by wall reduction, and significantly lighter in comparison to cast iron differential case assemblies known in the art. One of ordinary skill in the art also understands that a clutch pack may be readily incorporated by means of a modified flow form mandrel with the differential case assembly 2, 2' described hereinabove.

While certain representative embodiments and details have been shown for purposes of illustrating the invention, it will be apparent to those skilled in the art that various changes may be made without departing from the scope of the disclosure, which is further described in the following appended claims.

What is claimed is:

1. A differential case assembly, comprising:
    a differential case having an open end and a side wall with an interior surface, a plurality of major internal splines formed on the interior surface of the side wall; and
    a gear assembly including a first retainer insert, a second retainer insert, and a cross pin, the first retainer insert disposed adjacent the interior surface of the side wall between a first pair of the major internal splines, the first retainer insert having a hole formed therein, the cross pin having an end received in the hole of the first retainer insert to align the gear assembly within the differential case;
    wherein the first retainer insert disposed between the first pair of the major internal splines is adjacent a second pair of internal splines that do not receive the second retainer insert.

2. The differential case assembly of claim 1, wherein the differential case is flow formed.

3. The differential case assembly of claim 1, further comprising an end cap disposed in the open end of the differential case.

4. A differential case assembly, comprising:
    a differential case having an open end and a side wall with an interior surface, a plurality of major internal splines formed on the interior surface of the side wall; and
    a gear assembly including a retainer insert and a cross pin, the retainer insert disposed adjacent the interior surface of the side wall between a pair of the major internal splines, the retainer insert having a hole formed therein, the cross pin having an end received in the hole of the retainer insert to align the gear assembly within the differential case, wherein the differential case assembly further includes an end cap disposed in the open end of the differential case, and, wherein the differential case has an annular array of minor internal splines formed on the open end.

5. The differential case assembly of claim 4, wherein the end cap includes an annular array of minor external splines that mesh with the minor internal splines of the differential case.

6. The differential case assembly of claim 3, further comprising a ring gear having a lip that axially retains the end cap in the differential case.

7. The differential case assembly of claim 6, wherein the ring gear has an angled inner surface facilitating access for welding and providing a radial clamping force on the open end of the differential case.

8. A differential case assembly, comprising:
    a differential case having an open end and a side wall with an interior surface, a plurality of major internal splines formed on the interior surface of the side wall; and
    a gear assembly including a retainer insert and across pin, the retainer insert disposed adjacent the interior surface of the side wall between a pair of the major internal splines, the retainer insert having a hole formed therein, the cross pin having an end received in the hole of the retainer insert to align the gear assembly within the differential case, wherein an outer diameter of the differential case increases adjacent the open end to facilitate access to a joint between the differential case and the ring gear for the welding.

9. The differential case assembly of claim 8, wherein the ring gear has a varying inner diameter that cooperates with a tapered end portion of the differential case to militate against the differential case breathing outwards during an operation of the differential case assembly.

10. The differential case assembly of claim 9, wherein each of the ring gear and the tapered end portion of the differential case has a flat portion adjacent the joint to facilitate the welding.

11. A differential case assembly, comprising:
    a differential case having an open end and a side wall with an interior surface, a plurality of major internal splines formed on the interior surface of the side wall; and a gear assembly including a cross pin having a cylindrical main body with a pair of free ends, each of the free ends having a pair of beveled surfaces that cooperate with a pair of the major internal splines to align the gear assembly within the differential case, wherein each beveled surface of the pair of beveled surfaces is angled and a width of main body continuously decreases along a length of the beveled surfaces at each of the free ends from a maximum width of the main body of the cross pin.

12. The differential case assembly of claim 11, wherein the differential case is flow formed.

13. The differential case assembly of claim 11, wherein the gear assembly further comprises a washer disposed over the cross pin and adjacent the pair of major internal splines.

14. The differential case assembly of claim 11, wherein the interior surface between the pair of the major internal splines includes a recess formed therein.

15. The differential case assembly of claim 11, wherein each of the major internal splines has a groove formed in an end thereof.

16. A differential case for a differential case assembly, comprising:

a flow formed shell having an open end and a side wall with an interior surface, a plurality of major internal splines formed on the interior surface of the side wall, a pair of the major internal splines configured to receive a gear assembly including a first retainer insert, a second retainer insert, and a cross pin, wherein the first retainer insert is disposed between a first lair of the major internal splines and is adjacent a second pair of internal splines that do not receive the second retainer insert.

17. A differential case for a differential case assembly, comprising:

a flow formed shell having an open end and a side wall with an interior surface, a plurality of major internal splines formed on the interior surface of the side, a pair of the major internal splines configured to receive a gear assembly including a cross pin having a cylindrical main body with a pair of free ends, each of the free ends having a pair of beveled surfaces, wherein each beveled surface of the air of beveled surfaces is angled and a width of main body continuously decreases along a length of the beveled surfaces at each of the free ends from a maximum width of the main body of the cross pin.

18. An end cap for a differential case assembly, comprising:

a main body with an annular array of minor external splines configured to mesh with an annular array of minor internal splines formed on an open end of a differential case.

19. A ring gear for a differential case assembly, comprising:

a main body having a lip configured to be disposed on a differential case having an open end and a side wall with an interior surface, an end cap disposed in the open end of the differential case, and axially retain the end cap in the differential case;

wherein a top portion of the differential case has a width that initially increases from the open end toward a middle portion of the differential case, and wherein the ring gear has an angled inner surface abutting the top portion of the differential case for welding and providing a radial clamping force on the open end of the differential case.

* * * * *

UNITED STATES PATENT AND TRADEMARK OFFICE
CERTIFICATE OF CORRECTION

| | |
|---|---|
| PATENT NO. | : 8,444,522 B2 |
| APPLICATION NO. | : 13/094406 |
| DATED | : May 21, 2013 |
| INVENTOR(S) | : Timothy J. Cripsey et al. |

It is certified that error appears in the above-identified patent and that said Letters Patent is hereby corrected as shown below:

In the Claims

In column 6, line 53, in Claim 8, after the phrase "differential case and" please delete "the" and insert --a-- therefor.

In column 6, line 54, in Claim 8, after the phrase "ring gear for" please delete "the".

In column 6, line 45, in Claim 8, after the phrase "retainer insert and" please delete "across" and insert --a cross-- therefor.

In column 7, line 31, in Claim 16, after the phrase "between a first" please delete "lair" and insert --pair-- therefor.

In column 8, line 10, in Claim 17, after the phrase "surface of the" please delete "air" and insert --pair-- therefor.

Signed and Sealed this
Twenty-seventh Day of August, 2013

Teresa Stanek Rea
*Acting Director of the United States Patent and Trademark Office*